US008223467B2

(12) United States Patent
Morrish (10) Patent No.: US 8,223,467 B2
(45) Date of Patent: Jul. 17, 2012

(54) TRANSIENT BLOCKING UNIT USING NORMALLY-OFF DEVICE TO DETECT CURRENT TRIP THRESHOLD

(75) Inventor: Andrew J. Morrish, Saratoga, CA (US)

(73) Assignee: Bourns, Inc., Riverside, CA (US)

( * ) Notice: Subject to any disclaimer, the term of this patent is extended or adjusted under 35 U.S.C. 154(b) by 255 days.

(21) Appl. No.: 12/322,065

(22) Filed: Jan. 27, 2009

(65) Prior Publication Data

US 2009/0231773 A1 Sep. 17, 2009

Related U.S. Application Data

(60) Provisional application No. 61/065,416, filed on Feb. 11, 2008.

(51) Int. Cl.
*H02H 9/00* (2006.01)

(52) U.S. Cl. ............... 361/58; 361/59; 361/93.9

(58) Field of Classification Search .................. 361/58, 361/59, 91.1, 91.2, 91.5, 56, 93.9, 101, 111

See application file for complete search history.

(56) References Cited

U.S. PATENT DOCUMENTS

| 5,696,659 | A | 12/1997 | Maruo | |
|---|---|---|---|---|
| 6,970,337 | B2 * | 11/2005 | Strahm | 361/58 |
| 7,324,315 | B2 * | 1/2008 | Harris | 361/58 |
| 7,342,433 | B2 * | 3/2008 | Harris et al. | 327/427 |
| 7,369,387 | B2 * | 5/2008 | Harris et al. | 361/103 |
| 7,492,566 | B2 * | 2/2009 | Harris | 361/127 |
| 7,576,962 | B2 * | 8/2009 | Harris | 361/58 |
| 7,616,418 | B2 * | 11/2009 | Harris | 361/58 |
| 7,646,576 | B2 * | 1/2010 | Harris et al. | 361/111 |
| 2006/0098363 | A1 | 5/2006 | Hebert et al. | |
| 2006/0158816 | A1 * | 7/2006 | Harris | 361/118 |

FOREIGN PATENT DOCUMENTS

JP 06276659 9/1994

* cited by examiner

*Primary Examiner* — Patrick Salce

(74) *Attorney, Agent, or Firm* — Lumen Patent Firm (57) ABSTRACT

An isolation device having normally off detection is provided. The isolation device having normally off detection includes a transient blocking unit (TBU) having at least one depletion mode device disposed between a pair of sense terminals, and at least one normally off transition element disposed to drive a gate of the depletion mode device in the TBU, where the normally off transition element transitions from a first resistive state to a second resistive state and one depletion mode device is connected to one sense terminal, and the normally off transition element transitions by detection of a current through the TBU. The TBU can be unidirectional or bidirectional.

20 Claims, 14 Drawing Sheets

Prior Art

*FIG. 1*

Prior Art

TRANSIENT BLOCKING UNIT USING NORMALLY-OFF DEVICE TO DETECT CURRENT TRIP THRESHOLD

CROSS-REFERENCE TO RELATED APPLICATIONS

This application claims priority from US Provisional Patent Application 61/065,416 filed Feb. 11, 2008, which is incorporated herein by reference.

FIELD OF THE INVENTION

The invention relates generally to electrical isolation devices. More particularly, the invention relates to isolation devices having normally off detection transition elements disposed to drive the isolation device.

BACKGROUND

A transient blocking unit (TBU) is an arrangement of two or more transistors connected such that they rapidly and automatically switch off in response to an over-voltage or over-current situation. This functionality allows TBUs to provide protection for series-connected loads. Typical TBU designs rely on the threshold voltage of a depletion mode (i.e., normally on) transistor in order to set the TBU trip current. Unfortunately, the threshold voltage of a depletion mode transistor tends to be a relatively poorly controlled device parameter in fabrication.

Figure 1:
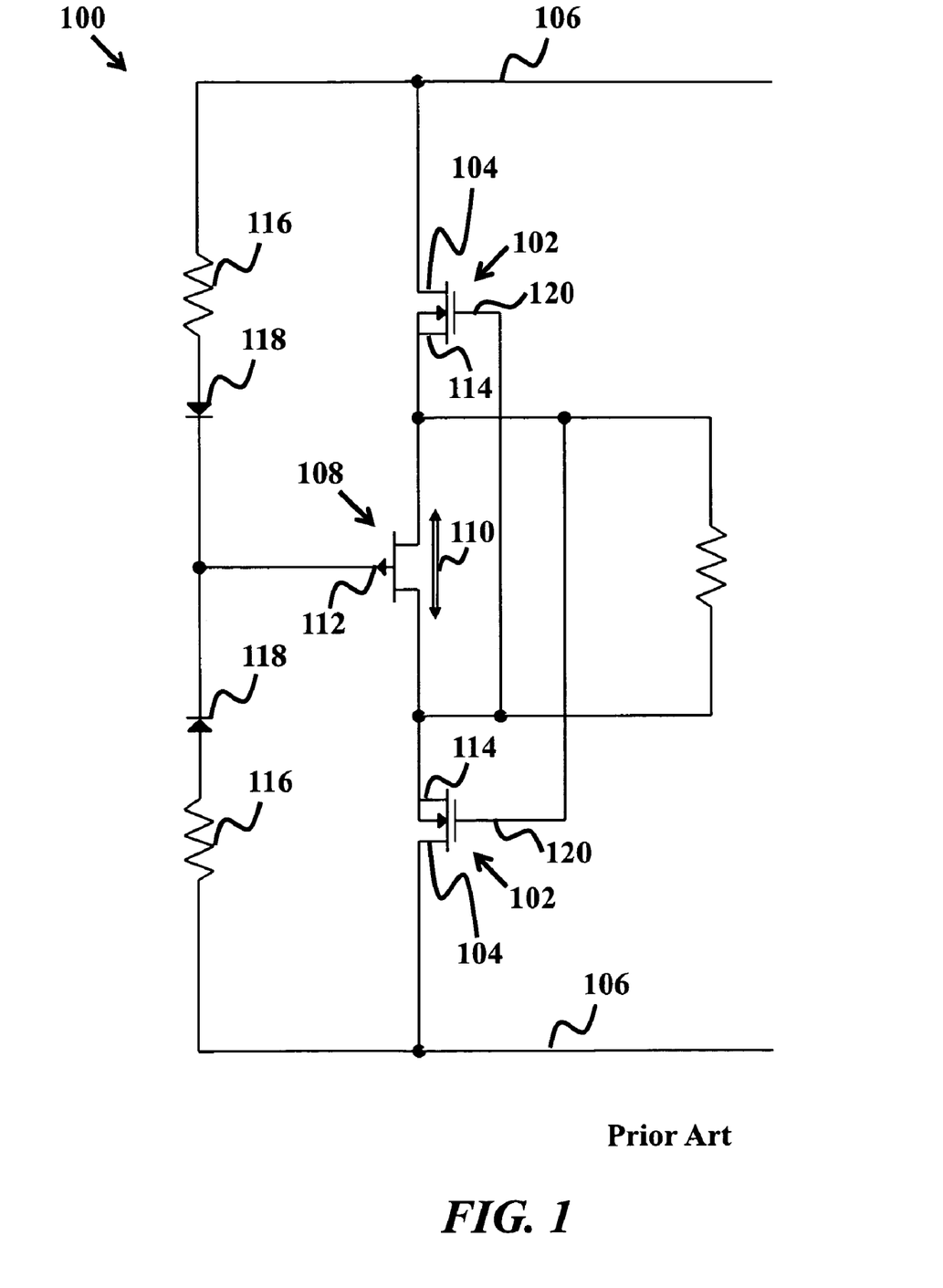
FIG. 1 shows a prior art basic bidirectional TBU circuit depends upon the depletion mode device for trip threshold.

A TBU can be a bi-directional TBU or a unidirectional TBU. The bi-directional TBU 100, as shown in FIG. 1, includes a pair of first-material depletion mode devices 102 each having a drain terminal 104 connected to a separate the sense terminal 106, and a second-material depletion mode device 108 having a conductive channel 110 connected between and in series with the pair of first-material depletion mode devices 102, where a gate terminal 112 of the second-material depletion mode device 108 is electrically connected to the drain terminal 114 of each the first-material depletion mode devices 102. According to one aspect of the bi-directional TBU 100, the gate terminal 112 of the second-material depletion mode device 108 is resistively connected 116 to the drain terminal 104 of each the first-material depletion mode devices 102. In another aspect of the bi-directional TBU 100, a diode 118 is connected between the gate terminal 112 of the second-material depletion mode device 108 and the drain terminal 104 of each the first-material depletion mode devices 102, where a cathode of the diode 118 is connected to the gate terminal 112 of the second-material depletion mode device 108 and an anode of the diode 118 is connected to the drain terminal 104 of the first-material depletion mode device 102. Further, drive of the gate 120 of the first-material depletion mode device 102 is triggered by detection of a current through the TBU 100 by virtue of the voltage developed across channel 110 of second-material depletion mode device 108. In another aspect of the bi-directional TBU 100, the first-material depletion mode device 102 is a p-type depletion mode device and the second-material depletion device 108 is an n-type depletion mode device. In a further aspect of bi-directional TBU 100, the first-material depletion mode device 102 is an n-type depletion mode device and the second-material depletion device 108 is a p-type depletion mode device.

Figure 2:
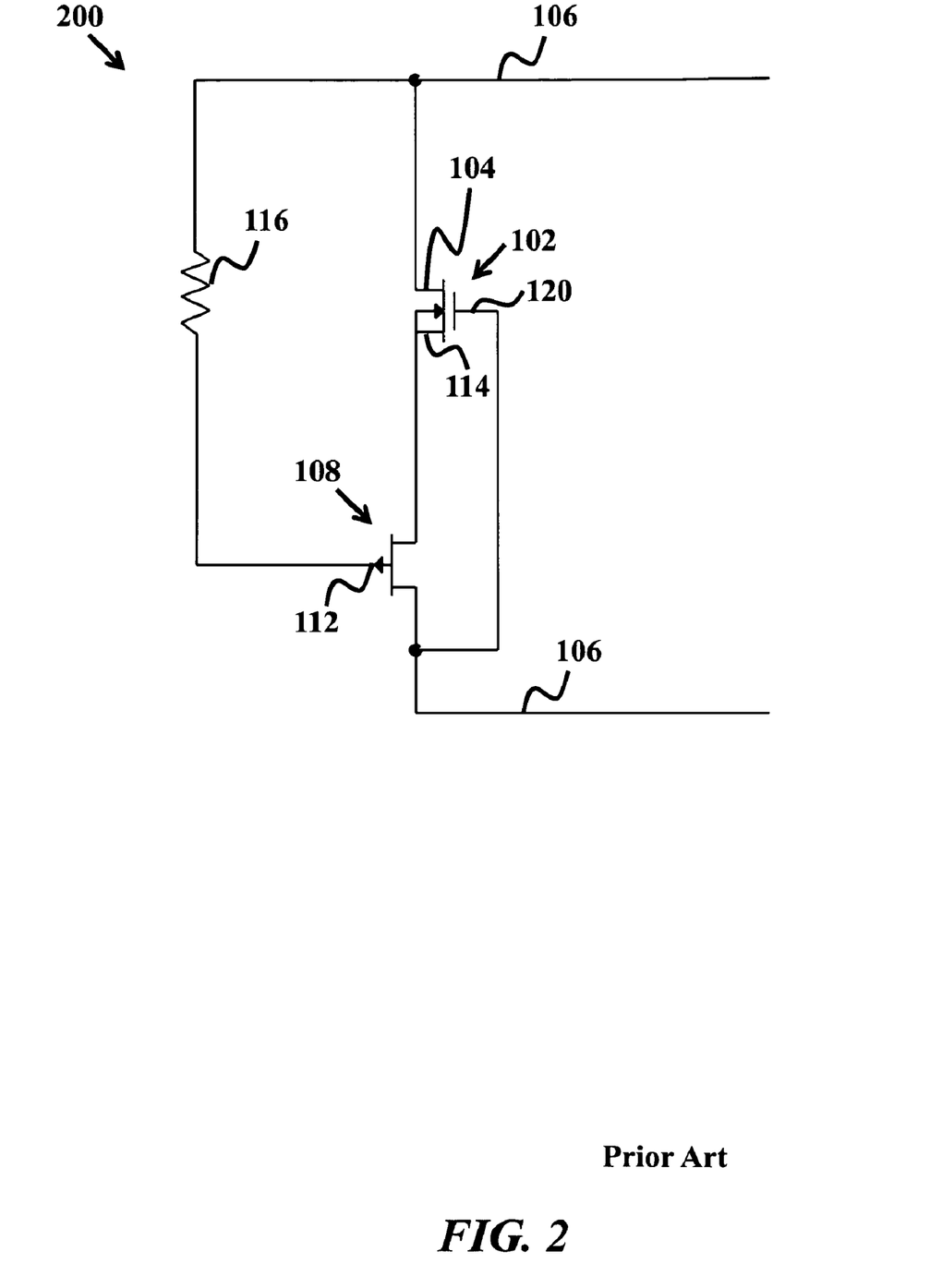
FIG. 2 shows a prior art basic unidirectional TBU circuit that depends upon the depletion mode device for trip threshold.

The unidirectional TBU 200 as shown in FIG. 2, includes a first-material depletion mode device 102 having a drain terminal 104 connected to a first the sense terminal 106, a second-material depletion mode device 108 having a conductive channel 110 connected in series with a source 114 of the first-material depletion mode device 102 and a second sense terminal 106, where a gate 112 of the second-material depletion mode device 108 is resistively connected 116 to a drain 104 of the first-material depletion mode device 102. Further, a gate 120 of the first-material depletion mode device 102 is triggered by detection of a current through the TBU 200. In another aspect of the unidirectional TBU 200, the first-material depletion mode device 102 is a p-type depletion mode device and the second-material depletion device 108 is an n-type depletion mode device. In a further aspect of the unidirectional TBU 200, the first-material depletion mode device 102 is an n-type depletion mode device and the second-material depletion device 108 is a p-type depletion mode device.

The TBU presents a problem in mass production: the basic design is sensitive to tolerance in the depletion mode NMOS, for example. The bi-directional TBU shown in FIG. 1 is used as a reference for a conventional TBU approach for comparison, but the basic design considerations are applicable to all TBU types, independent of the implementation of gate feedback to the PJFET, for example. Also the same concepts can be applied to a unidirectional TBU 200 of FIG. 2 or the bi-direction TBU 100 of FIG. 1.

Figure 3:
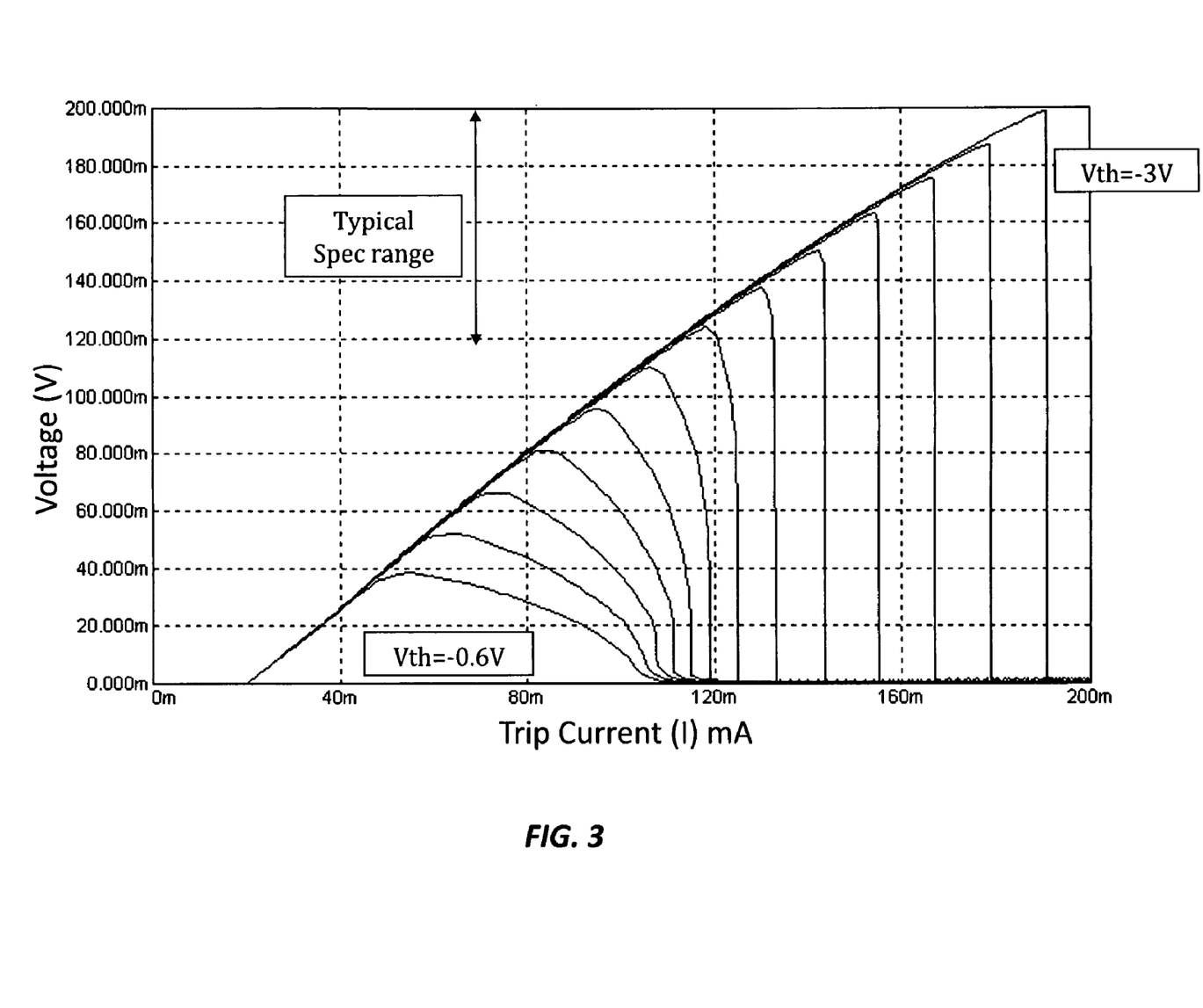
FIG. 3 shows a graph of changes in NMOS threshold having a direct affect on the trip current.

Changes in the NMOS threshold directly affect the trip current. For example, in the simulation shown in FIG. 3, the trip current is seen to vary widely when varying the threshold ($V_{th}$) of the NMOS over a range from $-3.0V$ (the highest trip current in the simulation ~200 mA) to $-0.6V$ (~40 mA) in 0.2V steps.

This indicates that for a given JFET resistance, the maximum allowable range of the NMOS threshold is from $-3V$ to about $-1.5V$ in this example. In practice, the allowable range of NMOS threshold-variation is less, because the JFET parameters also vary considerably. Results of a Monte Carlo analysis are show in FIG. 4, where the effect of the JFET parameters varying with a standard deviation of 5% and, simultaneously, the NMOS threshold-variation is from $-1V$ to $-3V$. The Monte Carlo analysis assumes a Gaussian distribution of both parameters.

Figure 4:
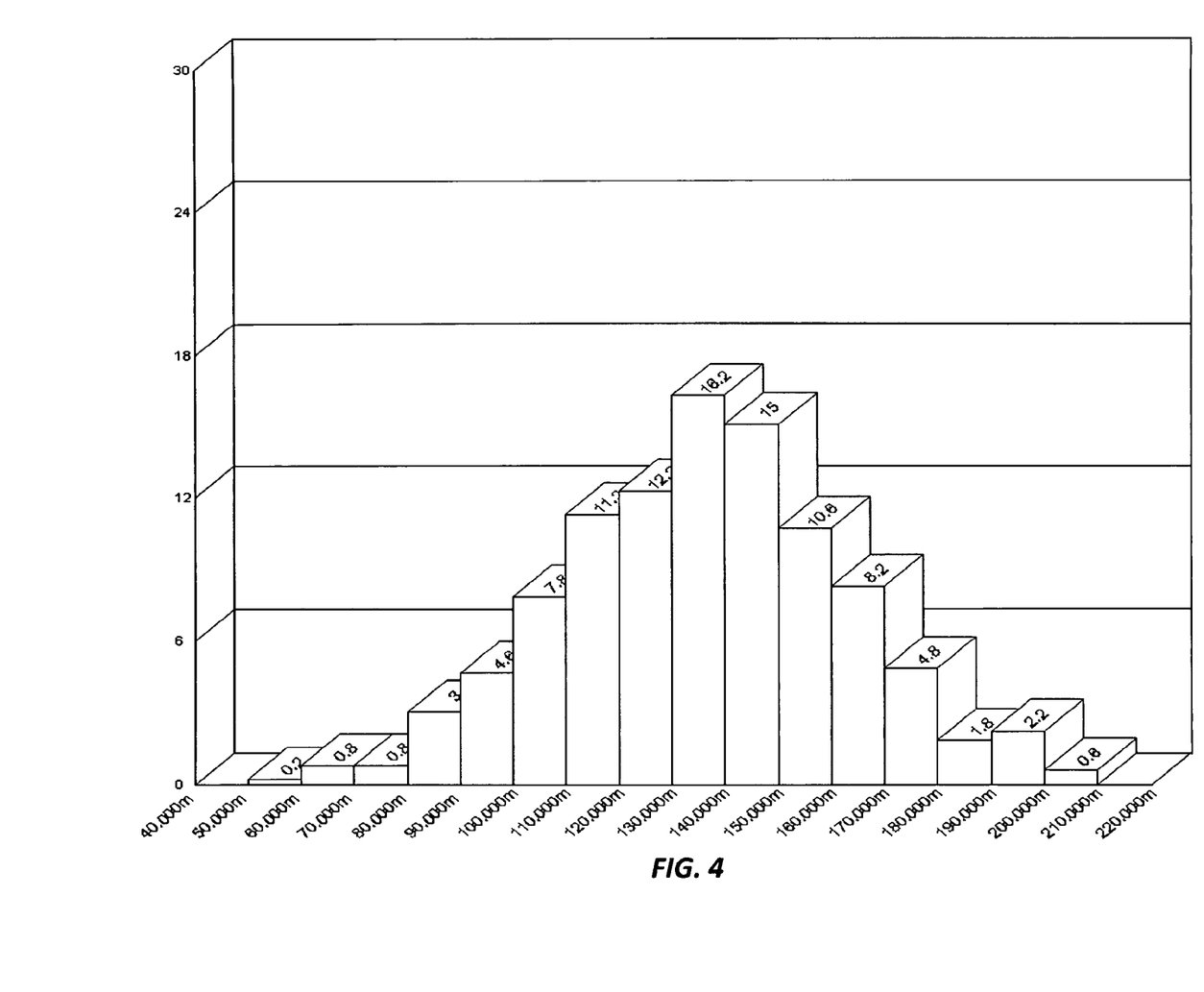
FIG. 4 shows a graph of results of a Monte Carlo analysis with the effect of the JFET parameters varying with a standard deviation of 5% and the NMOS threshold-variation from -1V to -3V.

The resulting distribution of FIG. 4 shows the trip falls outside of the typical design targets of the 120-200 mA limits of this exemplary TBU by a considerable amount, with a mean value of 135 mA and a standard deviation of 27 mA (20%).

Accordingly, there is a need to develop a device to address the problem of the poorly controlled threshold voltage parameter in fabrication of a depletion mode transistor in a TBU.

SUMMARY OF THE INVENTION

The present invention provides an isolation device having normally off detection. The isolation device having normally off detection includes a transient blocking unit (TBU) having at least one depletion mode device disposed between a pair of sense terminals, and at least one normally off transition element disposed to drive a gate of the depletion mode device in the TBU, where the normally off transition element transitions from a first resistive state to a second resistive state and one depletion mode device is connected to one sense terminal, and the normally off transition element transitions by detection of a current through the TBU.

According to one aspect of the invention, the normally off transition element includes a four terminal network having two output terminals and two input terminals, where a resistance across the output terminals is controlled by a signal present on the input terminals. Here, the normally off transition element can share a common reference to the output and the input terminals. Further, the output terminal can resistively coupled to the sense terminal.

In another aspect of the invention, the normally off transition element includes a collection of active and passive devices, where the active and passive devices provide a switching function. The active and passive devices can include a MOSFET, a JFET, a bipolar transistor, a comparator, an operational amplifier, and an electromechanical relay.

In a further aspect, the TBU can be a unidirectional TBU and a bi-directional TBU.

According one embodiment, the unidirectional TBU includes a first-material depletion mode device having a drain terminal connected to a first sense terminal, a second-material depletion mode device having a conductive channel connected in series with a source of the first-material depletion mode device and a second the sense terminal, where a gate of the second-material depletion mode device is resistively connected to a drain of the first-material depletion mode device. In one aspect of the current embodiment, the normally off transition element is disposed to drive a gate of the first-material depletion mode device, where the normally off transition element is triggered by detection of a current through the TBU. In another aspect of the current embodiment, the first-material depletion mode device is a p-type depletion mode device and the second-material depletion device is an n-type depletion mode device. In a further aspect of the current embodiment, the first-material depletion mode device is an n-type depletion mode device and the second-material depletion device is a p-type depletion mode device. In yet another aspect of the current embodiment, the gate of the first-material depletion mode device is resistively connected to the sense terminal.

According to another embodiment, the bidirectional TBU includes a pair of first-material depletion mode devices each having a drain terminal connected to a separate the sense terminal, and a second-material depletion mode device having a conductive channel connected between and in series with the pair of first-material depletion mode devices, where a gate terminal of the second-material depletion mode device is electrically connected to the drain terminal of each the first-material depletion mode devices. According to one aspect of the current embodiment, the gate terminal of the second-material depletion mode device is resistively connected to the drain terminal of each the first-material depletion mode devices. In another aspect of the current embodiment, a diode is connected between the gate terminal of the second-material depletion mode device and the drain terminal of each the first-material depletion mode devices, where an anode of the diode is connected to the gate terminal of the second-material depletion mode device and a cathode of the diode is connected to the drain terminal of the first-material depletion mode device. In another aspect of the current embodiment, the normally off transition element is disposed to drive a gate of the first-material depletion mode device, wherein the normally off transition element is triggered by detection of a current through the TBU. According to a further aspect of the current embodiment, the first-material depletion mode device is a p-type depletion mode device and the second-material depletion device is an n-type depletion mode device. In a further aspect, the first-material depletion mode device is an n-type depletion mode device and the second-material depletion device is a p-type depletion mode device.

According to another aspect of the invention, the depletion mode device can be MOSFET's, JFET's, or relays.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 5:
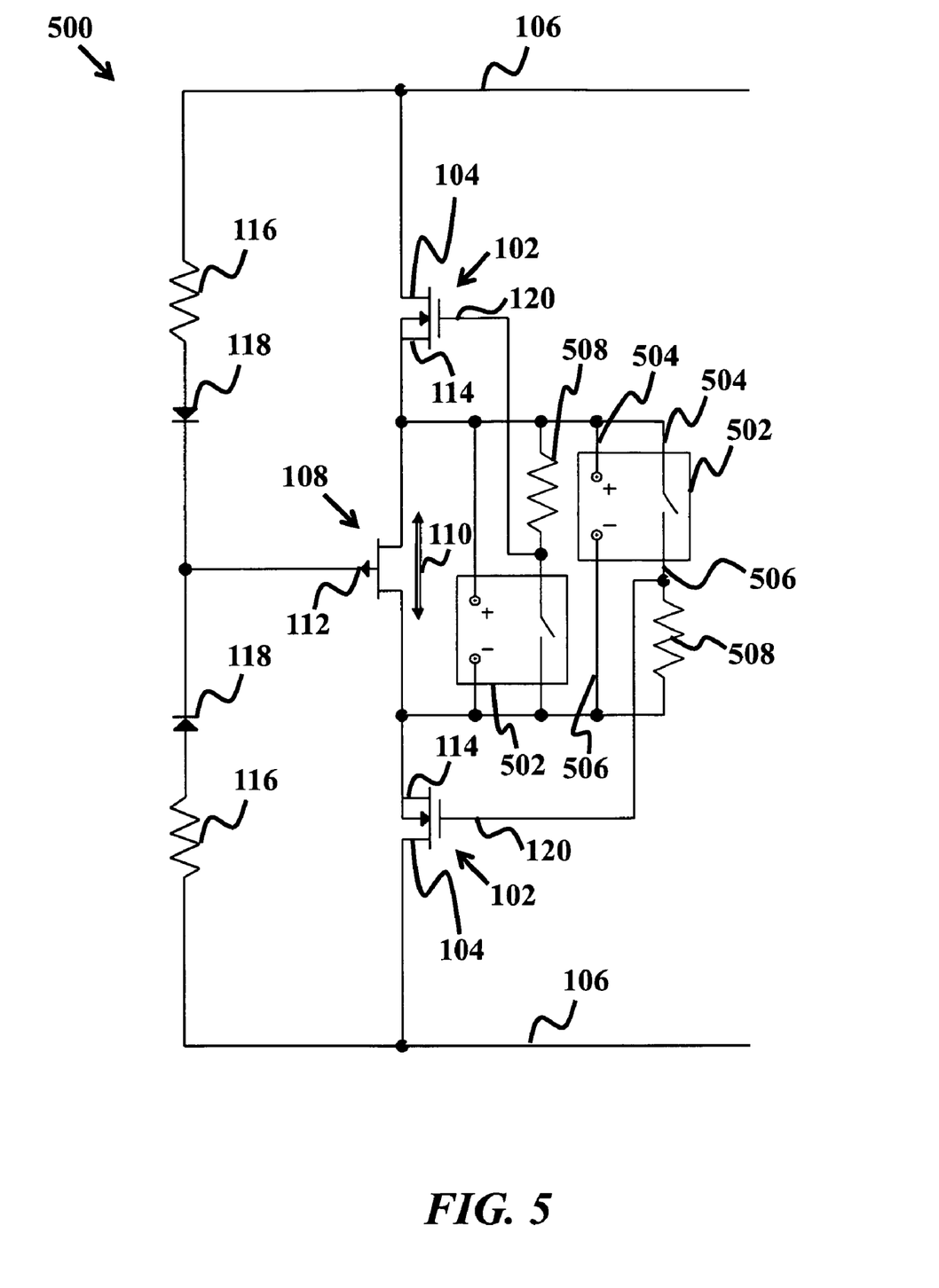
FIG. 5 shows a generalized bi-directional TBU circuit that does not depend upon the depletion mode device for trip threshold according to the present invention.

FIG. 5 shows a generalized bi-directional TBU circuit that does not depend upon the depletion mode device for trip threshold 500. As shown, the problem of the dependence upon the first depletion mode device 102 can be avoided if a normally off switch 502 is used to drive the gate 120 of the first depletion mode device 102, where the switch 502 is triggered by detection of the current through the transient blocking unit (TBU) 500. It is understood that the "switch"

500 is a transition element that transitions from a first resistive state to a second resistive state when a preset threshold is reached at its input terminals. The present invention provides an isolation device having normally off detection that includes a TBU (100/200) having at least one depletion mode device 102 disposed between a pair of sense terminals 106, and at least one normally off transition element 502 disposed to drive a gate 120 of the depletion mode device 102 in the TBU (100/200), where the normally off transition element 502 transitions from a first resistive state to a second resistive state and one depletion mode device 102 is connected to one sense terminal 106, and the normally off transition element 502 transitions by detection of a current through the TBU (100/200).

The simplest way to detect current through the TBU (100/200), and also, if necessary, to provide a source of power to the switch 502 is by monitoring the voltage developed across the depletion mode device 102, which in the example of FIG. 5 is a PJFET. When the current reaches the trip level, typically a voltage of say 1V is reached which is high enough to drive the detection system.

The circuit in FIG. 5 shows voltage-controlled switches 502, which are normally off that turn on when the voltage across the sense terminals 106 is above a certain threshold. As the threshold is no longer dependant upon the depletion mode device 102, the TBU (100/200) becomes insensitive to variations in that device's threshold.

According to one aspect of the invention as shown in FIG. 5, the normally off transition element 502 can include a four terminal network having two input terminals 504 and two output terminals 506, where a resistance across the output terminals 506 is controlled by a signal present on the input terminals 504. Here, the normally off transition element 502 can share a common reference to the output 506 and the input terminals 504. Further, as shown in FIG. 6, the output terminal 506 can resistively coupled 508 to the sense terminal 106.

There are various means of creating a voltage-controlled switch in practice. In the example of FIG. 5 and FIG. 6, the simplest method is to use an enhancement mode NMOS, with a threshold of 1V, for example. According to the current invention, the normally off transition element 502 can include a collection of active and passive devices, where the active and passive devices provide a switching function. The active and passive devices can include a MOSFET, a JFET, a bipolar transistor, a comparator, an operational amplifier, and an electromechanical relay.

Figure 6:
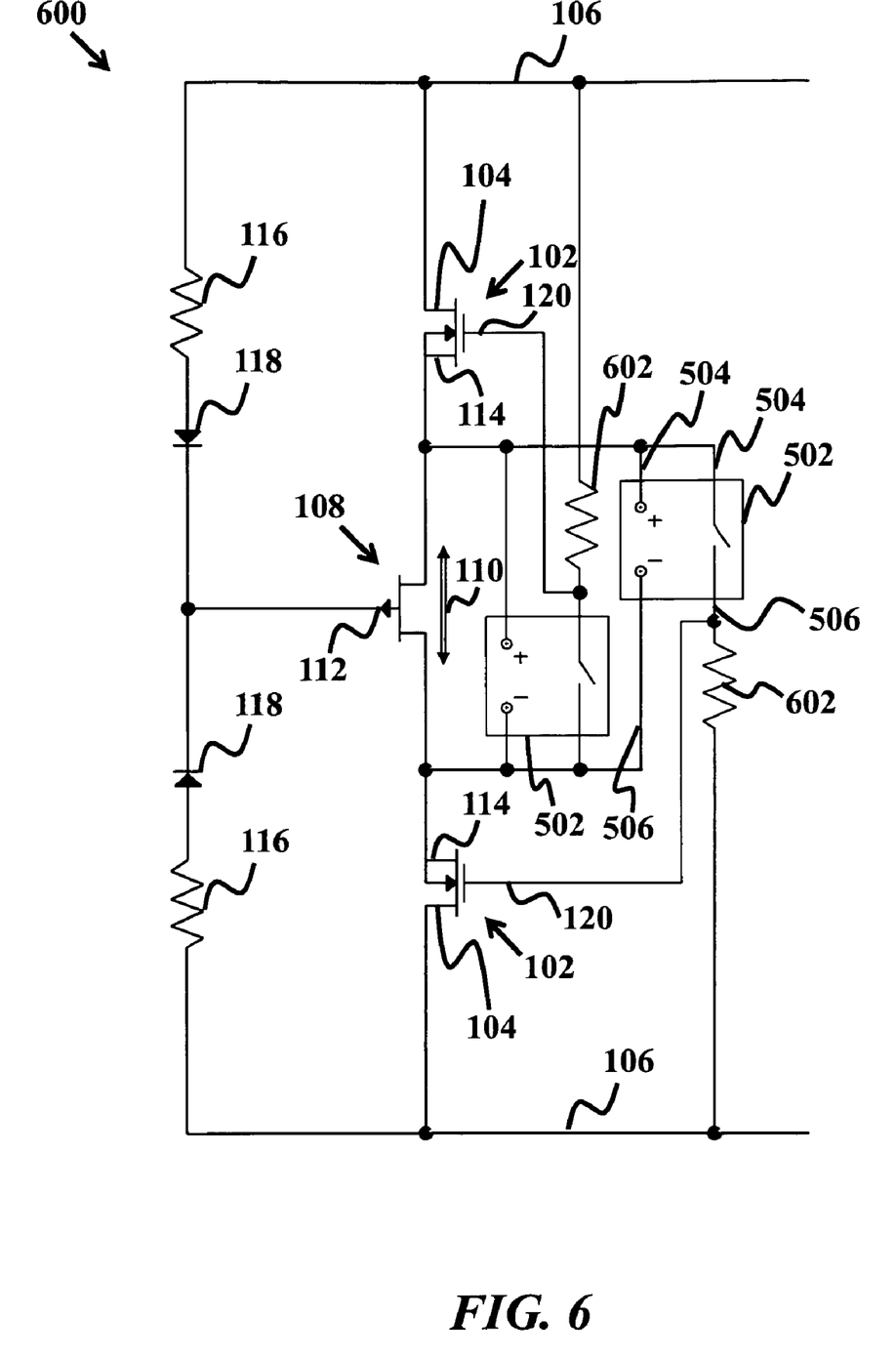
FIG. 6 shows a generalized bi-directional TBU circuit that does not depend upon the depletion mode device for trip threshold with the switch output terminal resistively coupled to a sense terminal according to the present invention.

As shown in FIG. 5 and FIG. 6, the resistors (508, 602) provide a gate reference for the depletion mode devices 102 when the switch 502 is off. In this case, the gate 120 is maintained at zero volts during the time when the switch 502 is open. It is also possible to configure the circuit with the resistor 602, or some alternative design of current source (eg a MOSFET current source), from gate 120 to the drain 104 of the device.

This is advantageous under certain conditions, as the gate 120 is connected to the drain 104 while the switch 502 is off, thus providing increasing gate voltage, and hence lower on-state resistance of the depletion devices 102, which in turn results in better linearity of TBU resistance versus current. Above certain voltages, the gate voltage may become excessive, and a more complex current source may be required to prevent excessive voltage on the gate 120, such a clamp. The approach shown in the FIG. 6 is therefore generally preferable for lower voltage designs, where additional circuitry in the form of a gate voltage limiting circuit is not required.

The variation of typical depletion mode NMOS devices in production has been shown to be much greater than the inherent variation of the basic enhancement device threshold before doping. For example, it has been observed that the average depletion mode threshold of a production depletion mode NMOS varies between about −0.4 to −1.5V, whereas the average enhancement mode device of similar construction only varies between about 1.45V to 1.65V.

Figure 7:
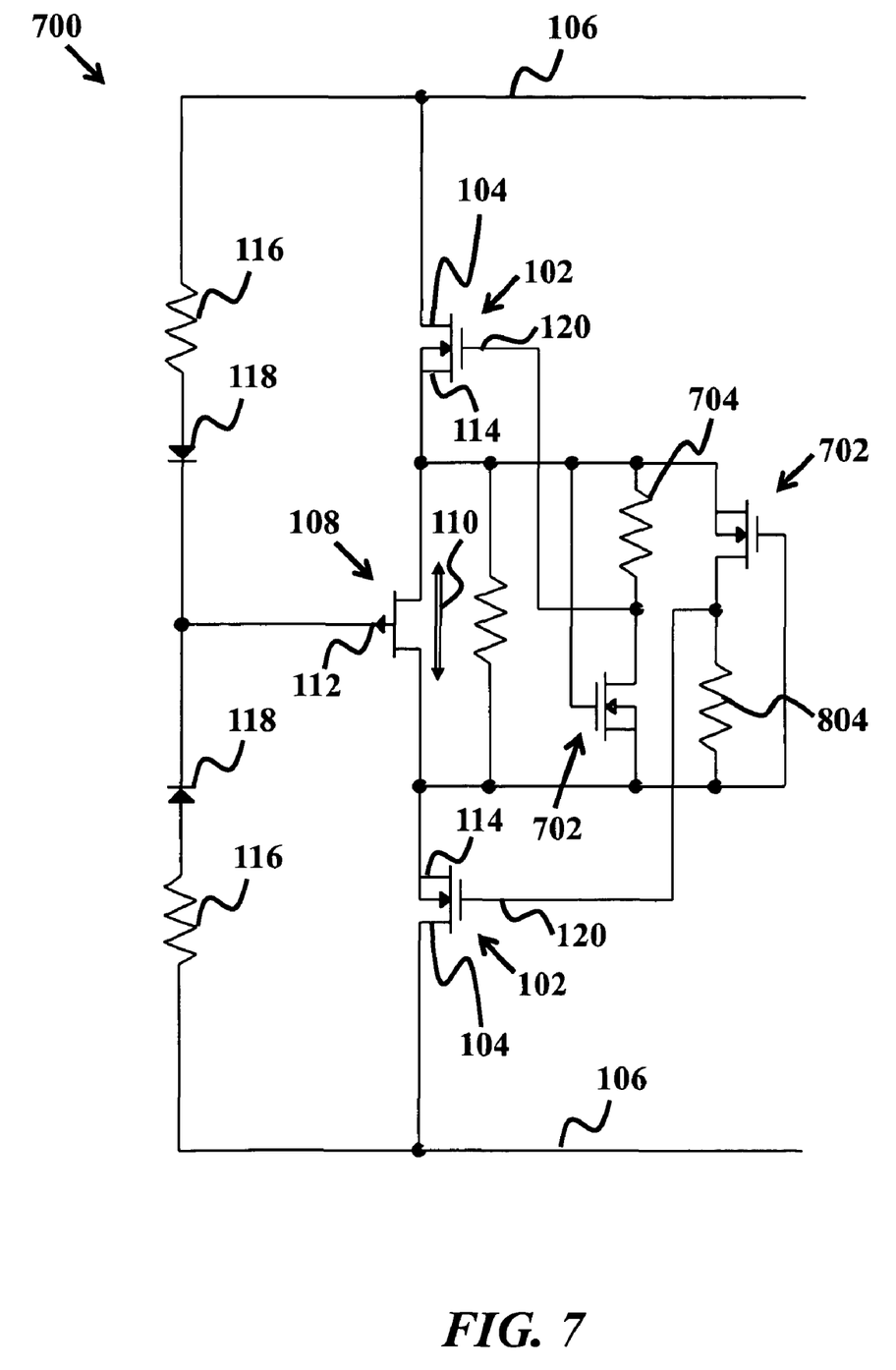
FIG. 7 shows a TBU circuit using enhancement mode devices according to the present invention.

According to an alternate embodiment 700 of the current invention, shown in FIG. 7, the circuit overcomes the susceptibility to threshold variation by using a small low voltage enhancement mode transistor 702 as a voltage controlled switch to detect the threshold of the trip current. Here, the small transistors 702 are low voltage enhancement mode devices. The Rdson of these devices is chosen appropriately so they will not slow the turn on of the high voltage NMOS. The threshold of these devices in this example is set at about 1V.

Figure 8:
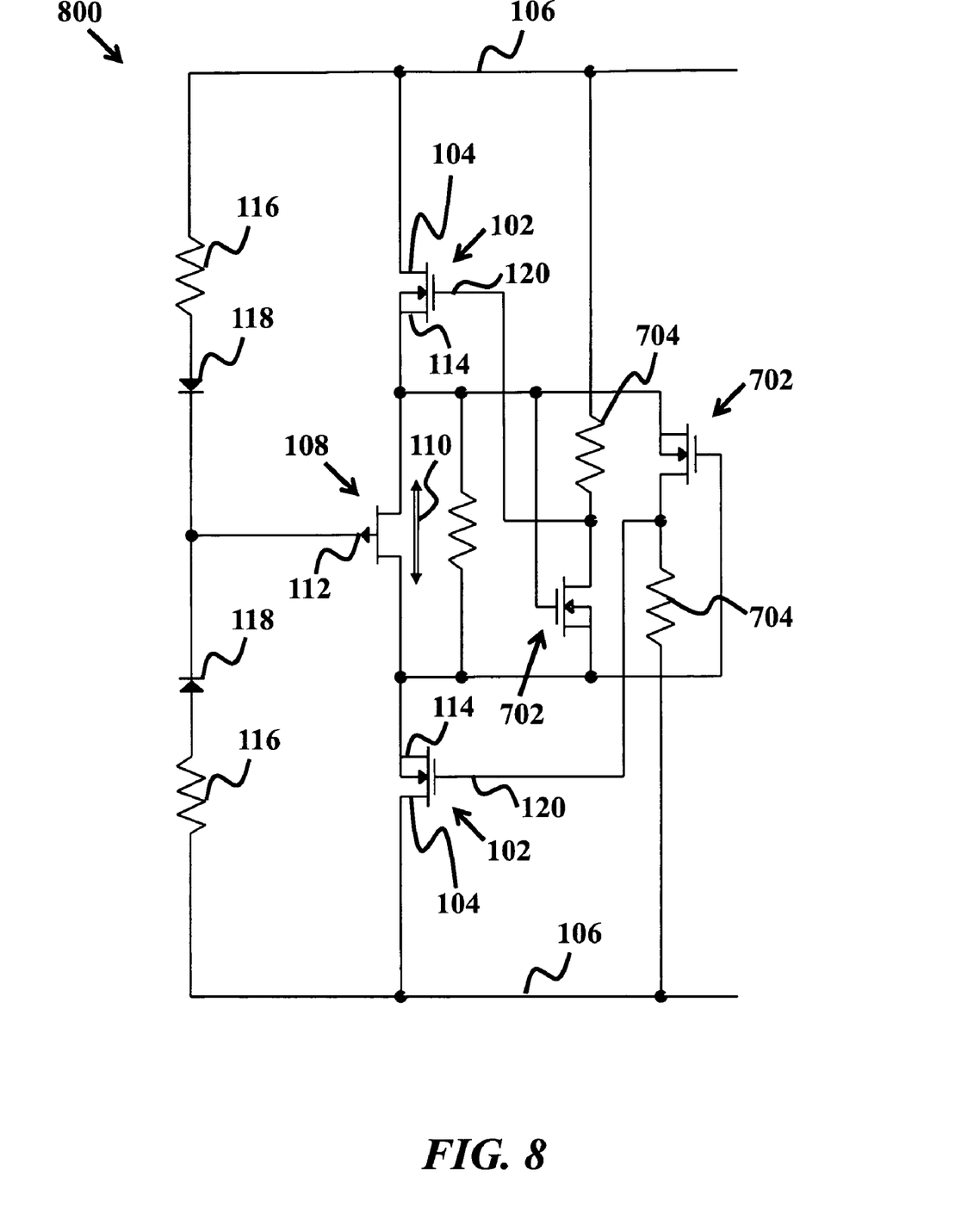
FIG. 8 shows a TBU circuit using enhancement mode devices with the drain terminal resistively coupled to a sense terminal according to the present invention.

In this case, and for simplicity, the gate drive resistors 704 are connected to the source 114 of the NMOS device 102, but as mentioned previously could, under certain design conditions, be connected to the drain instead (see FIG. 8 for example), for possible advantage in Rdson and linearity.

Devices 702 are the same depletion NMOS, and the PJFET 108 is also the same as the exemplary design previously discussed.

Figure 9:
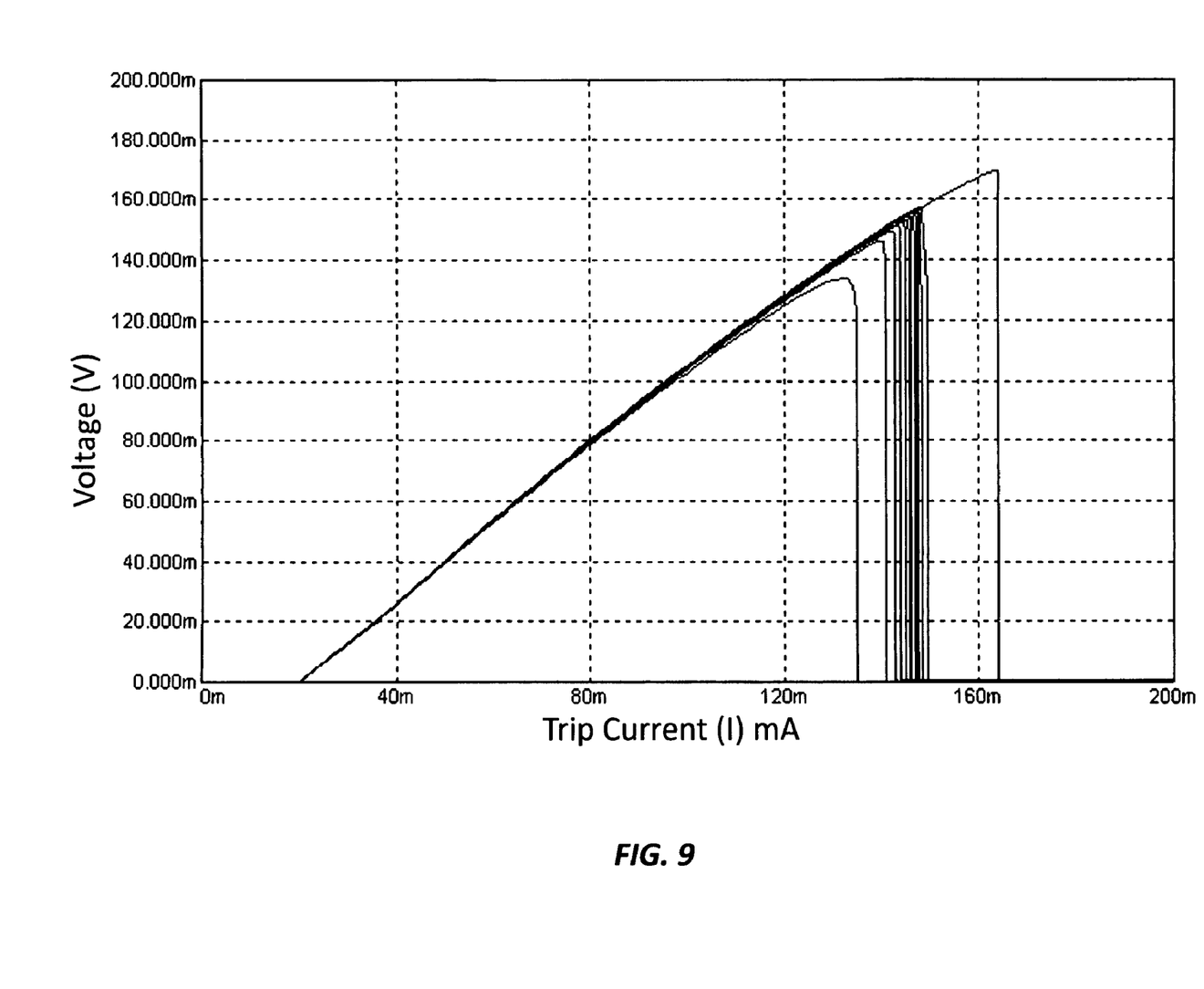
FIG. 9 shows a graph of improved changes in sensitivity of the NMOS threshold having a direct affect on the trip current according to the current invention.

Simulating the performance using the same range of NMOS threshold from −3.0V to −0.6V in 0.2V steps gives the results shown in FIG. 9. As shown, the maximum current trip of 170 mA corresponds to a threshold of −3V, and the lowest trip current of 130 mA corresponds to the threshold of −0.6V.

It can be seen that as the threshold is stepped from −2.8V to −0.8V in 0.2V steps, the curves lie very tightly bundled around the target value of 150 mA, within around +/−3 mA. Thus over a very wide range, the design is insensitive to the depletion mode NMOS threshold variation.

Figure 10:
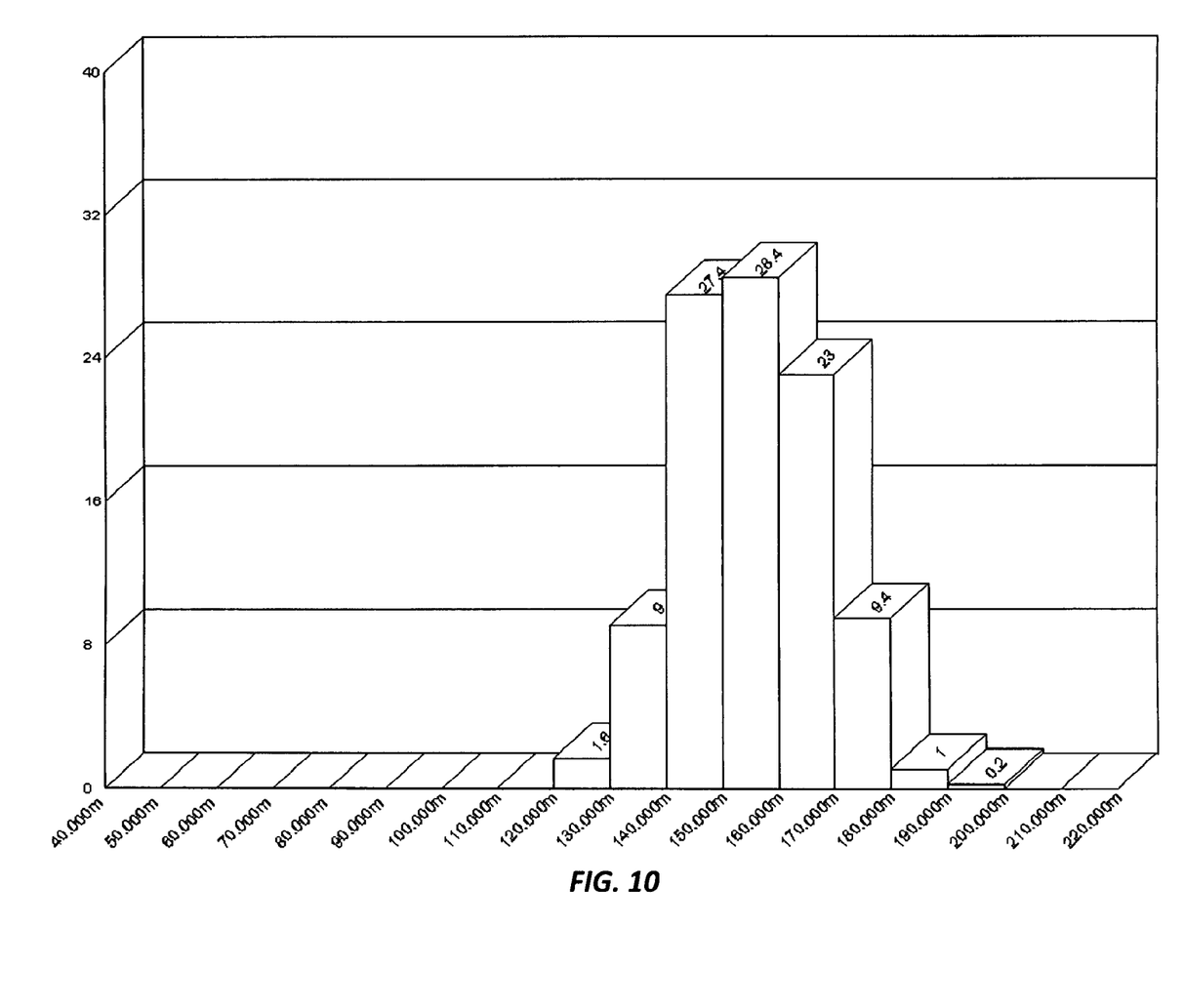
FIG. 10 shows a graph of results of a Monte Carlo analysis with the effect of the JFET parameters varying with improved tolerance according to the current invention.

Variations in the small enhancement mode NMOS will cause some variation, as will variations in the JFET. The Monte Carlo analysis shown in FIG. 10 allows similar variation in the depletion NMOS and JFET to the previous analysis, but also allows for a variation of +/−0.2V in the small enhancement mode device. This is considerably more than the actual enhancement mode devices have shown in practice. Here, the Monte Carlo analysis shows that the tolerance has been significantly improved compared to the original design, with a mean of 155mA and a sigma of 12.1 mA (7.8%). All devices fall within the typical spec range of 120 to 200 mA even with the extreme range of NMOS used.

Thus, it can be seen that the use of an enhancement mode NMOS device to set the trip threshold greatly reduces the sensitivity of the TBU trip current to variations in the high voltage NMOS implant.

As it should be evident, it is also be possible to use an alternative form of normally off threshold detection that derives its operating supply from the voltage developed across the sensing device, or via the feedback network. In the exemplary case, a depletion NMOS is used. A bipolar transistor could also be used, with or without a temperature compensation network, as this would operate in a similar normally off threshold detection mode. Moreover, more complex forms of a normally off threshold detection device, such as a small op amp or comparator could be used, referenced to a stable or compensated source, whereby such a device could be powered by the inherent voltages generated inside the TBU, such as for example, the voltage generated across the PJFET as the TBU current approaches the current sense limit. The illustrative example provided is the easiest form of this self-powered threshold detection stage.

Figure 11:
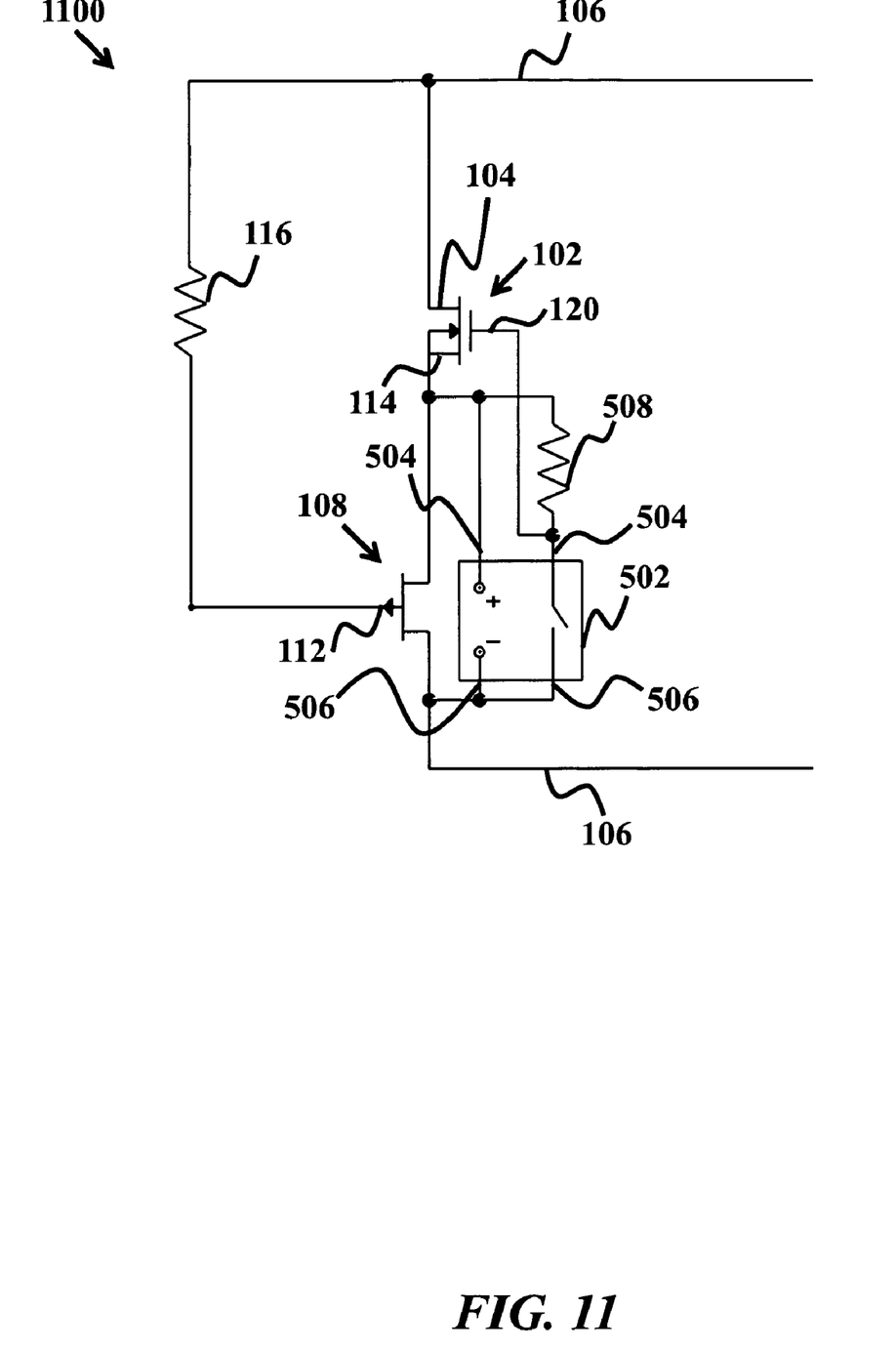
FIG. 11 shows a generalized unidirectional TBU circuit that does not depend upon the depletion mode device for trip threshold according to the present invention.
Figure 12:
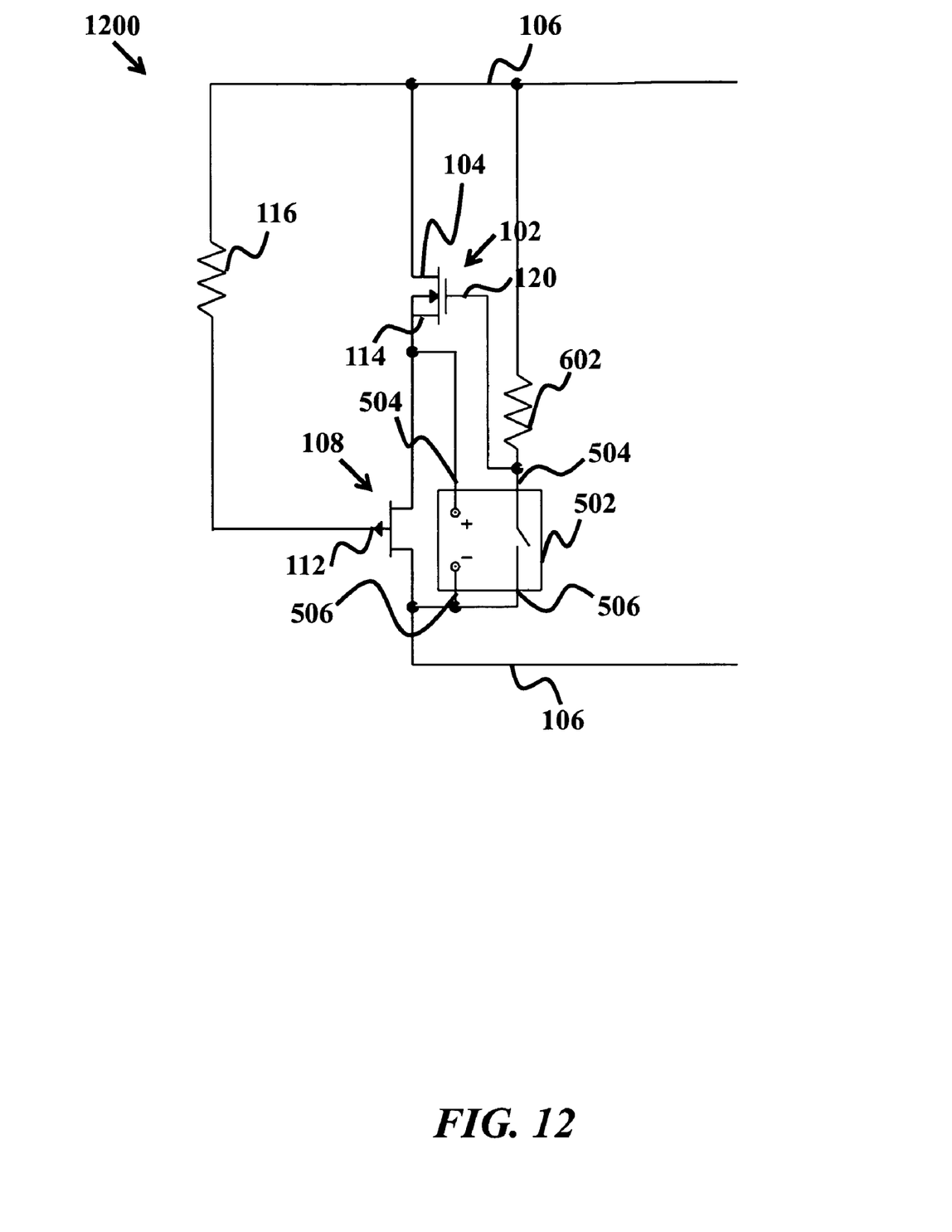
FIG. 12 shows a generalized unidirectional TBU circuit that does not depend upon the depletion mode device for trip threshold with the switch output terminal resistively coupled to a sense terminal according to the present invention.
Figure 13:
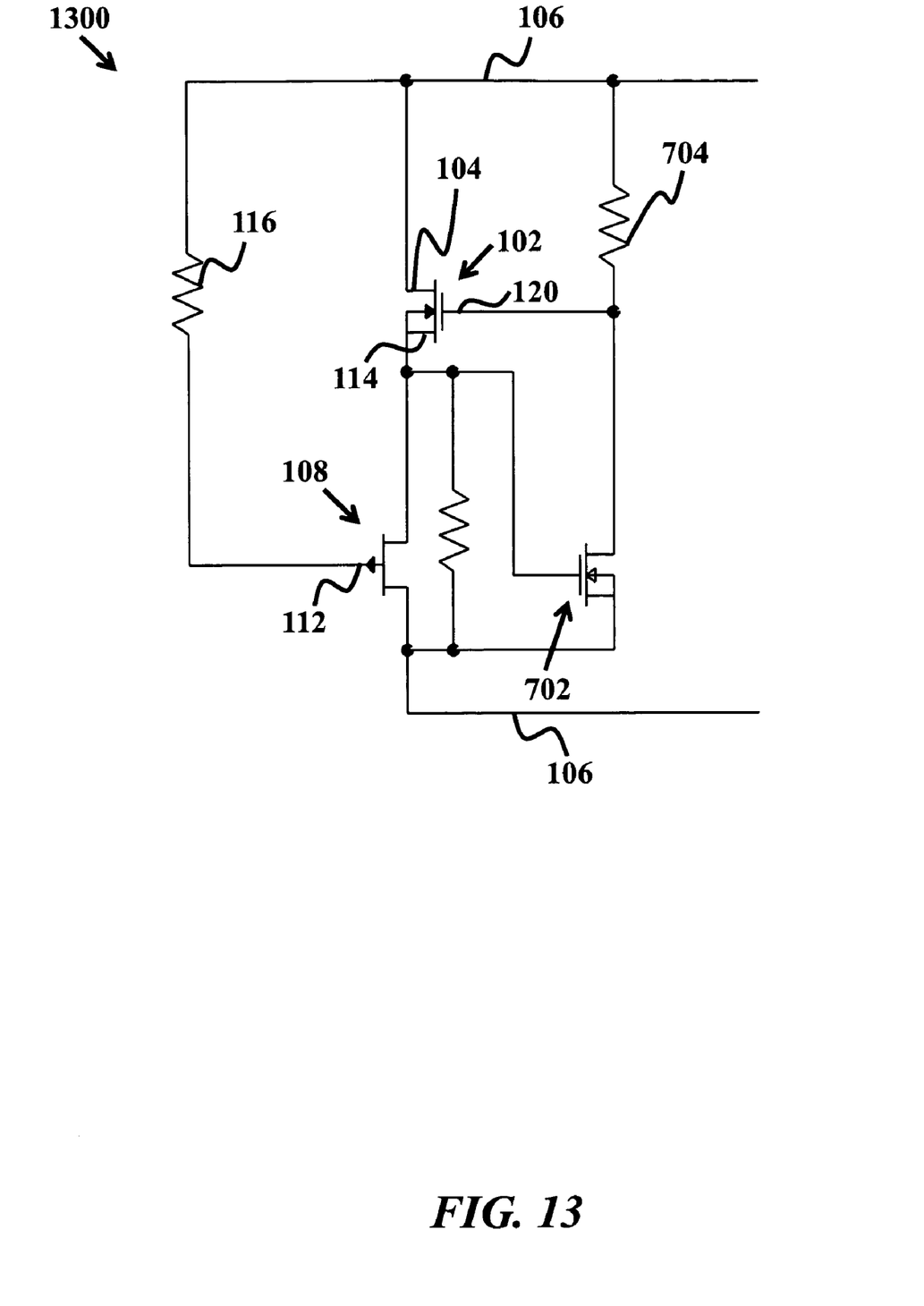
FIG. 13 shows a unidirectional TBU circuit using enhancement mode devices with the drain terminal resistively coupled to a sense terminal according to the present invention.

It should be further evident that the principles set forth for the exemplary bi-directional TBU 100 are easily applied to the unidirectional TBU 200, where FIGS. 11-13 show unidirectional TBUs 200 having the alternative aspects described for the bi-directional TBUs of FIGS. 5, 6 and 9, respectively. Accordingly, FIG. 11 shows a generalized unidirectional TBU circuit 1100 that does not depend upon the depletion mode device for trip threshold. FIG. 12 shows a generalized unidirectional TBU circuit 1200 that does not depend upon the depletion mode device for trip threshold with the switch output terminal resistively coupled to a sense terminal according to the present invention. FIG. 13 shows a unidirectional TBU circuit 1300 using enhancement mode devices with the drain terminal resistively coupled to a sense terminal according to the present invention.

Figure 14:
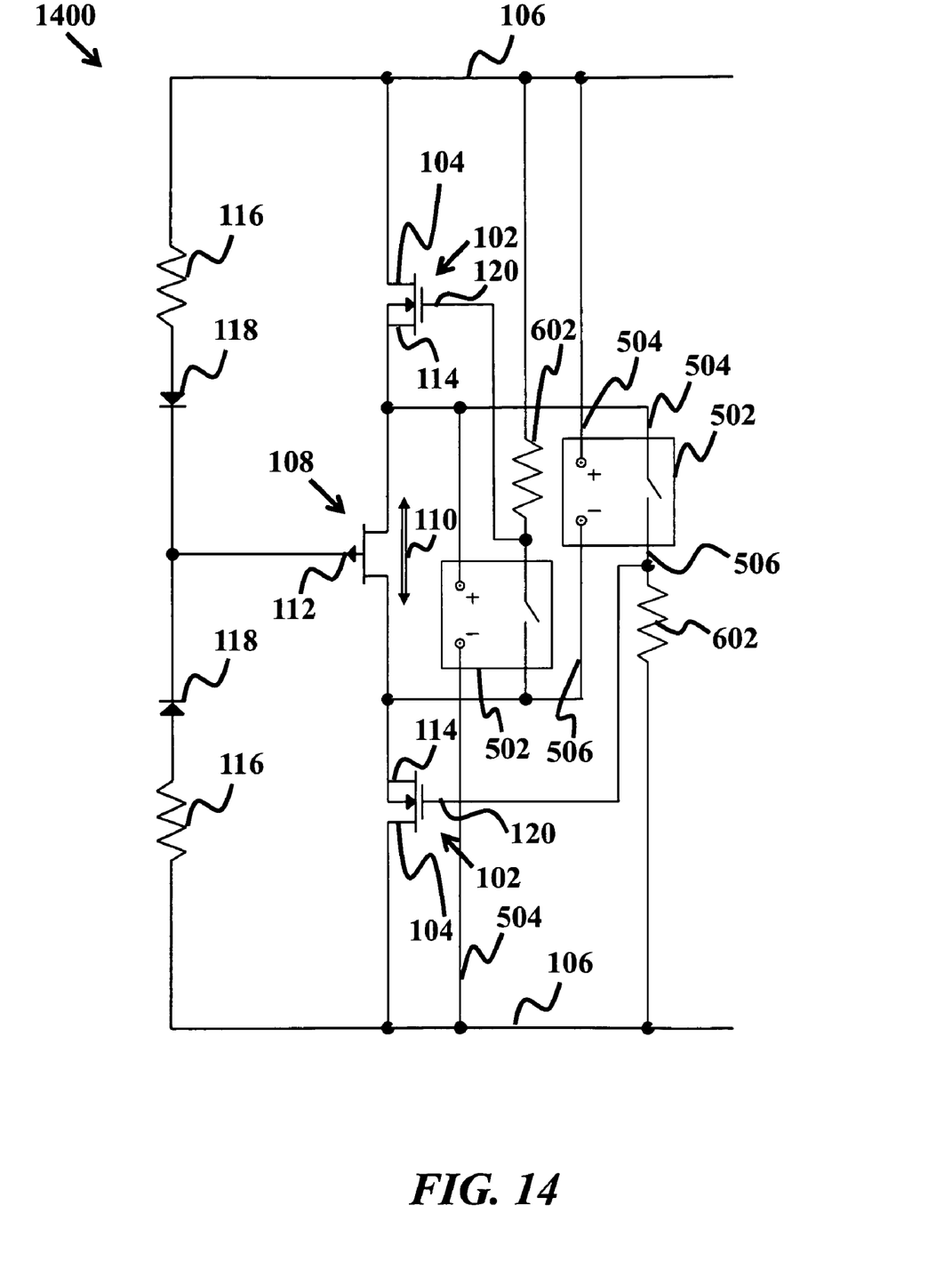
FIG. 14 shows a bi-directional TBU having sensing terminals of the switch connected between the source of the NMOS and the output terminals according to the present invention.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, FIG. 14 shows the a further embodiment 1400 having sensing terminals 504 of the switch 502 connected between the source 114 of the NMOS 102 and the output terminals 106. This has the advantage of allowing the resistance of the reversed NMOS 102 to be added to the PJFET 108 resistance, so giving a higher sensing voltage for a given current, making it easier to use with an enhancement mode transistor. This is particularly advantageous for low current threshold TBU's.

It is understood that other arrangements with the diodes and/or resistors are possible in connecting the transistors, switches and terminals, and are within the scope of the current invention.

All such variations are considered to be within the scope and spirit of the present invention as defined by the following claims and their legal equivalents.

What is claimed:

1. An isolation device having normally off detection comprising:
    a. a transient blocking unit (TBU), wherein said TBU comprises at least one depletion mode device disposed between a pair of sense terminals; and
    b. at least one enhancement mode device, wherein said enhancement mode device comprises a normally off transition element disposed to drive a gate of said depletion mode device in said TBU, wherein said normally off transition element comprises a collection of active and passive devices, wherein said active and passive devices provide a switching function, wherein said normally off transition element transitions from a first resistive state to a second resistive state, wherein one said depletion mode device is connected to one said sense terminal and wherein said normally off transition element transitions by detection of a current through said TBU.

2. The isolation device of claim 1, wherein said normally off transition element comprises a four terminal network having two output terminals and two input terminals, wherein a resistance across said output terminals is controlled by a signal present on said input terminals.

3. The isolation device of claim 2, wherein said normally off transition element shares a common reference to said output and said input terminals.

4. The isolation device of claim 2, wherein said output terminal is further resistively coupled to said sense terminal.

5. The isolation device of claim 1, wherein said active and passive devices are selected from a group consisting of a MOSFET, a JFET, a bipolar transistor, a comparator, an operational amplifier, and an electro-mechanical relay.

6. The isolation device of claim 1, wherein said TBU is selected from a group consisting of a unidirectional TBU and a bi-directional TBU.

7. The isolation device of claim 6, wherein said unidirectional TBU comprises:
    a. a first-material depletion mode device having a drain terminal connected to a first said sense terminal;
    b. a second-material depletion mode device having a conductive channel connected in series with a source of said first-material depletion mode device and a second said sense terminal, wherein a gate of said second-material depletion mode device is resistively connected to a drain of said first-material depletion mode device.

8. The isolation device of claim 7, wherein said normally off transition element is disposed to drive a gate of said first-material depletion mode device, wherein said normally off transition element is triggered by detection of a current through said TBU.

9. The isolation device of claim 7, wherein said first-material depletion mode device is a p-type depletion mode device and said second-material depletion device is an n-type depletion mode device.

10. The isolation device of claim 7, wherein said first-material depletion mode device is an n-type depletion mode device and said second-material depletion device is a p-type depletion mode device.

11. The isolation device of claim 7, wherein said gate of said first-material depletion mode device is resistively connected to said sense terminal.

12. The isolation device of claim 2, wherein said bi-directional TBU comprises:
    a. a pair of first-material depletion mode devices each having a drain terminal connected to a separate said sense terminal; and
    b. a second-material depletion mode device having a conductive channel connected between and in series with said pair of first-material depletion mode devices, wherein a gate terminal of said second-material depletion mode device is electrically connected to said drain terminal of each said first-material depletion mode devices.

13. The isolation device of claim 12, wherein said gate terminal of said second-material depletion mode device is resistively connected to said drain terminal of each said first-material depletion mode devices.

14. The isolation device of claim 12, wherein a diode is connected between said gate terminal of said second-material depletion mode device and said drain terminal of each said first-material depletion mode devices, wherein a cathode of said diode is connected to said gate terminal of said second-material depletion mode device and an anode of said diode is connected to said drain terminal of said first-material depletion mode device.

15. The isolation device of claim 12, wherein said normally off transition element is disposed to drive a gate of said first-material depletion mode device, wherein said normally off transition element is triggered by detection of a current through said TBU.

16. The isolation device of claim 12, wherein said first-material depletion mode device is a p-type depletion mode device and said second-material depletion device is an n-type depletion mode device.

17. The isolation device of claim 12, wherein said first-material depletion mode device is an n-type depletion mode device and said second-material depletion device is a p-type depletion mode device.

18. The isolation device of claim 12, wherein said gate of said first depletion mode device is resistively connected to said sense terminal.

19. The isolation device of claim 12, wherein said gate of said first depletion mode device is resistively connected to its source.

20. The isolation device of claim 1, wherein said depletion mode device is selected from a group consisting of MOSFET's, JFET's, and relays.

* * * * *